United States Patent
Haugsjaahabink et al.

(10) Patent No.: US 12,071,899 B2
(45) Date of Patent: Aug. 27, 2024

(54) PUMP SYSTEM FOR A GAS TURBINE ENGINE

(71) Applicant: Hamilton Sundstrand Corporation, Charlotte, NC (US)

(72) Inventors: Todd Haugsjaahabink, Amherst, MA (US); Ryan Shook, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/197,499

(22) Filed: May 15, 2023

(65) Prior Publication Data

US 2023/0304442 A1    Sep. 28, 2023

Related U.S. Application Data

(63) Continuation of application No. 17/408,330, filed on Aug. 20, 2021, now Pat. No. 11,649,768.

(51) Int. Cl.
*F02C 7/236* (2006.01)
*F02C 7/232* (2006.01)
*F02C 9/28* (2006.01)

(52) U.S. Cl.
CPC .......... *F02C 7/236* (2013.01); *F02C 7/232* (2013.01); *F02C 9/28* (2013.01); *F05D 2270/301* (2013.01)

(58) Field of Classification Search
CPC .. F02C 7/22; F02C 7/232; F02C 7/236; F02C 9/30; F04B 23/04; F04D 15/0072
See application file for complete search history.

(56) References Cited

U.S. PATENT DOCUMENTS

| 4,245,964 A * | 1/1981 | Rannenberg | F04C 14/02 60/734 |
| 5,118,258 A | 6/1992 | Martin | |
| 6,250,894 B1 * | 6/2001 | Dyer | F04D 13/14 417/279 |

(Continued)

FOREIGN PATENT DOCUMENTS

| EP | 2479408 A2 | 7/2012 |
| EP | 2500552 A2 | 9/2012 |
| EP | 3232036 A1 | 10/2017 |

OTHER PUBLICATIONS

Extended European Search Report dated Jan. 27, 2023, issued during the prosecution of European Patent Application No. EP 22191536.6, 7 pages.

*Primary Examiner* — Alain Chau
(74) *Attorney, Agent, or Firm* — Kinney & Lange, P. A.

(57) ABSTRACT

A pump system for a gas turbine engine including a first pump connected to a fluid flow demand line for delivering fluid to a fluid flow demand and a second pump connected, in parallel to the first pump, to the fluid flow demand line and supplementing fluid to the actuation or burner system based on the fluid flow demand. A pressure regulating valve (PRV) is fluidly connected to the flow demand line for bypassing flow to a pump inlet pressure of the first pump and second pump, and controlling a modulated pressure flow signal to a bypass valve, wherein the bypass valve is in fluid communication with the second pump and the PRV for receiving modulated pressure from the PRV and regulating delivery of fluid from the second pump to a bypass flow line.

15 Claims, 4 Drawing Sheets

(56) References Cited

U.S. PATENT DOCUMENTS

| | | |
|---|---|---|
| 7,770,388 B2 | 8/2010 | Desai |
| 8,172,551 B2 * | 5/2012 | Baker ..................... F02C 7/236 417/213 |
| 8,596,993 B2 | 12/2013 | Kleckler |
| 8,893,466 B2 | 11/2014 | Reuter |
| 8,951,021 B2 | 2/2015 | Hutto, Jr. |
| 8,991,152 B2 | 3/2015 | Heitz |
| 9,140,191 B2 | 9/2015 | Haugsjaahabink |
| 9,353,688 B2 * | 5/2016 | Futa .......................... F02C 7/22 |
| 10,502,138 B2 | 12/2019 | Reuter et al. |
| 11,867,124 B2 * | 1/2024 | Shimamura ............... F23K 5/04 |
| 2008/0289338 A1 | 11/2008 | Desai |
| 2010/0089026 A1 | 4/2010 | Baker et al. |
| 2010/0242431 A1 * | 9/2010 | Baker ..................... F02C 7/232 417/278 |
| 2011/0139123 A1 | 6/2011 | Brocard et al. |
| 2011/0289925 A1 * | 12/2011 | Dyer ....................... F02C 7/236 60/734 |
| 2012/0156061 A1 * | 6/2012 | Baker ..................... F02C 7/236 417/288 |
| 2012/0186673 A1 | 7/2012 | Heitz |
| 2012/0219429 A1 | 8/2012 | Heitz |
| 2012/0234014 A1 * | 9/2012 | Reuter .................... F02C 9/263 60/773 |
| 2012/0234015 A1 | 9/2012 | Reuter |
| 2012/0260658 A1 * | 10/2012 | Bader ....................... F02C 9/30 60/734 |
| 2012/0266600 A1 * | 10/2012 | Bader ..................... F02C 7/236 60/734 |
| 2014/0196459 A1 * | 7/2014 | Futa .......................... F02C 7/22 60/734 |
| 2014/0311599 A1 | 10/2014 | Haugsjaahabink |
| 2017/0292451 A1 | 10/2017 | Reuter et al. |
| 2021/0010429 A1 | 1/2021 | Brady |
| 2022/0128006 A1 | 4/2022 | Shimamura ............... F02C 7/22 |

* cited by examiner

PUMP SYSTEM FOR A GAS TURBINE ENGINE

CROSS-REFERENCE TO RELATED APPLICATION

This application is a continuation application of U.S. patent application Ser. No. 17/408,330 filed on Aug. 20, 2021, the contents of which are incorporated herein by reference in their entirety.

BACKGROUND

Technological Field

The present disclosure relates generally to an improved fuel pumping system for a gas turbine engine, and more particularly to a pump system having dual parallel pumps.

Description of Related Art

Gas turbine engines typically include a compressor compressing air and delivering it to a combustion chamber. The compressed air is mixed with fuel in the combustion chamber, combusted, and the products of combustion pass downstream over turbine rotors, driving the rotors to create power.

There are many distinct features involved in a gas turbine engine. As one example only, the compressor may be provided with variable vanes which are actuated to change an angle of incident dependent on system conditions. Actuators for changing the angle of incident of the vanes, and any other actuator or flow demand needed for engine operation, are provided with hydraulic fluid from a positive displacement pump. While conventional engines, components, and methods of designing aircraft engines have generally been considered satisfactory for their intended purpose there is still a need in the art for improved engine architecture that is more efficient and adaptable to extreme and typical conditions. The present disclosure provides a solution for this need.

SUMMARY OF THE INVENTION

A pump supply system that can employ fuel for a gas turbine engine is disclosed. The system includes a first positive displacement pump connected to a fuel flow demand line delivering fuel to an actuation or burner system based on a fuel flow demand, a second positive displacement pump connected to the fuel flow demand line in parallel to the first pump supplementing fuel to the actuation or burner system based on the fuel flow demand, a pressure regulating valve (PRV) fluidly connected with the first pump and the flow demand line for returning excess flow to a bypass flow fuel line and controlling modulated pressure to a bypass valve, which is in fluid communication with the second pump and the PRV for receiving modulated pressure from the PRV and regulating delivery of fuel from the second pump to a bypass flow fuel line. The system can include an aircraft burner or actuation system. The bypass valve can be hydraulically controlled. The first pump and the second pump can be different sizes.

The PRV can be actuated by a first Electro-Mechanical Interface Device (EMID) which receives electronic signals from an Electronic Engine Control (EEC) which measures pressure at the fuel flow line for delivering fuel to the actuation or burner system from the first pump and from the second pump versus the required pressure for the actuation or burner system as determined by the EEC. A pressure sensor can be connected to the fuel flow demand line, configured to measure demand flow pressure to the EEC. A second, independent EMID can be used for controlling the bypass valve. A second independent pressure sensor can be connected to a fuel line connecting the bypass valve and the second pump, configured to supply that pressure data to the EEC.

The system can include a first check valve and a second check valve for allowing flow from each of the pumps to the flow demand, wherein fuel flow from the first pump and the second pump to the actuation or burner system is controlled by a corresponding check valve. The PRV can receive bypass fuel flow from the first pump and provides bypass fuel flow directed to the first pump and the second pump inlet. The PRV provides bypass fuel flow directed to the inlet of the first pump and the second pump when the PRV is in at least a partially open position. The PRV is fluidically connected to pump inlet pressure and provides a pressure signal to the bypass valve, with a high pressure signal being provided when the PRV is in a closed position and the signal pressure reducing to pump inlet pressure as the PRV becomes more open.

The second check valve can be fully closed during a first mode. The first check valve can be fully open during a first mode. The second check valve can be fully open during a second mode.

The bypass valve can be closed during a second mode (to be described as high fuel demand conditions in the specification), allowing the second pump to supplement fuel delivery to the actuation or burner system along the fuel flow demand line. The first check valve can be closed when the first pump is offline.

The PRV can be connected to the flow demand line by an orifice line. The orifice line can include an orifice therein for supplying a high pressure flow from the flow demand to modulated pressure which is connected to a signal window within the PRV, which provides flow to the pump inlet, thus reducing the modulated pressure the more open then PRV becomes.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
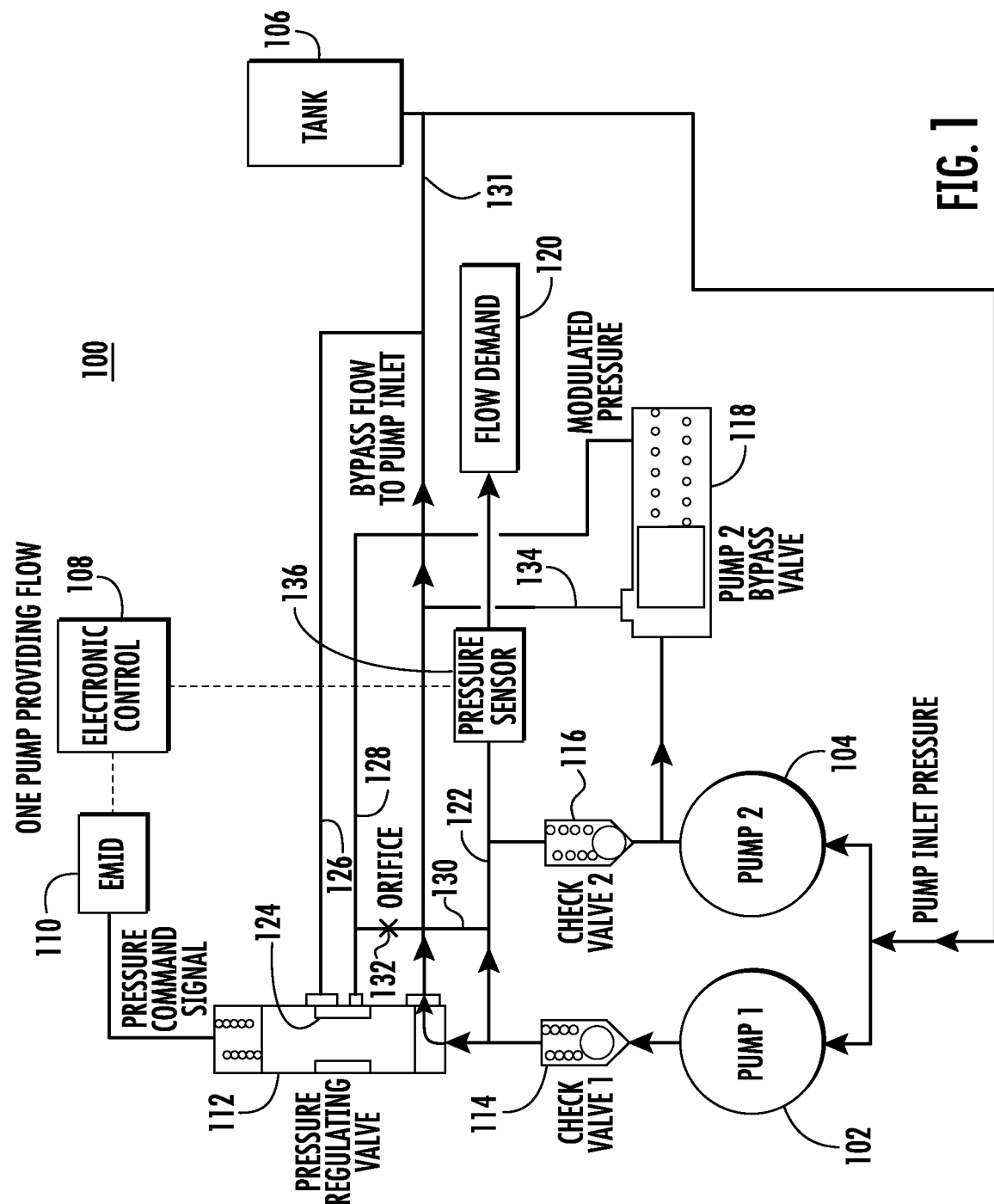
FIG. 1 is a schematic view of an embodiment of fuel supply system according to the disclosure in a first condition.

Reference will now be made to the drawings wherein like reference numerals identify similar structural features or aspects of the subject disclosure. For purposes of explanation and illustration, and not limitation, a partial view of an exemplary embodiment of a fuel system in accordance with the disclosure is shown in FIG. 1 and is designated generally by reference character 100. Other embodiments of the system in accordance with the disclosure, or aspects thereof, are provided in FIGS. 2-4, as will be described. The system can be used with an improved engine architecture that is more efficient and adaptable between extreme and typical flight conditions and flow requirements.

Referring now to FIG. 1, a fluid supply system 100 for a gas turbine engine is shown. The system 100 includes a first pump 102 connected to a flow demand line 122 delivering fuel to an actuation or burner system 120 based on a fuel flow demand and a second pump 104 connected to the fuel flow demand line 122 in parallel to the first pump 102 for supplementing the first pump 102. A pressure regulating valve 112 (PRV) is connected to the first pump 102. The PRV 112 is responsible for ensuring that a proper amount of fuel is distributed from the first and second pump 102/104 to the actuation or burner system 120 and a bypass flow 131 that leads back to the inlet of the pumps 102/104. The PRV 112 is also responsible for controlling modulated pressure 128 to the bypass valve 118. The bypass valve 118 is responsible for modulating the pressure of the second pump 104. The system 100 can be used on an aircraft as part of a combustion or actuation system. The first pump 102 and the second pump 104 can be different sizes i.e. having different flow rate capabilities, different pressure capability, physical sizes, etc. allowing the system to be optimized for typical conditions and not be sized for the extreme flow conditions.

Figure 4:
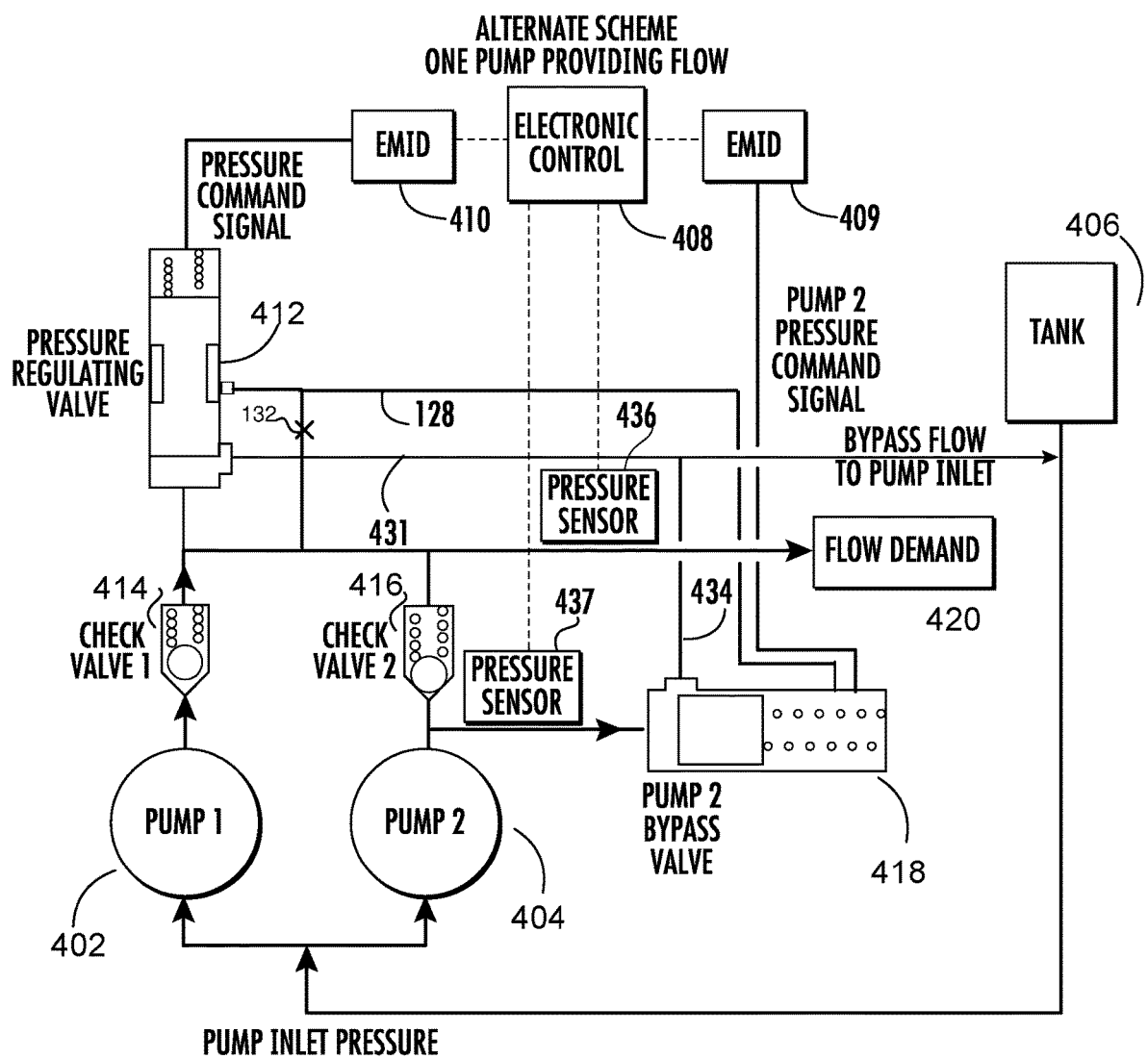
FIG. 4 is a schematic view of another embodiment of fuel supply system according to the disclosure in a first condition.

Referring further to FIG. 1, the PRV 112 is controlled by a first EMID 110, from which it receives pressure command signals based on flow demand 120. The EMID 110 receives signals from the Electronic Engine Control 108, which is responsible for controlling a plurality of systems. The EEC 108 receives pressure readings from the pressure sensor 136 which measures pressure of the fuel flow demand line 122 and compares it against required pressures. The PRV 112 bypasses flow in order to regulate the pressure of the demand flow. The desired pressure can be changed by adjusting the pressure in the spring cavity of the PRV. The pressure sensor provides pressure signal data to the EEC 108 and depending on the pressure requested by the EEC 108, an electronic signal is sent to the EMID 110 so that the EMID 110 will increase or decrease the pressure signal to the spring cavity of the PRV 112, moving the PRV 112 to a more closed or opened position, respectively, thus increasing or decreasing the pressure of the demand flow as requested. It is also considered that a second, independent EMID 409 can be used for controlling the bypass valve 418 (as shown in FIG. 4). In this configuration second independent pressure sensor 437 is also connected to the fuel line connecting the bypass valve 418 and the second pump 404 to supply pressure data to the EEC 408.

Referring again to FIGS. 1-3, the system 100 includes a first check valve 114 and a second check valve 116, wherein fuel flow from the first pump 102 and the second pump 104 to the actuation or burner system 120 is controlled by a corresponding check valve 114/116. The PRV 112 can receive fuel flow from the first pump 102 and provide bypass fuel flow 131 directed to the inlet of the first and the second pump 102/104. The first mode is where flow demand is low, for instance when actuators are not moving so flow to the actuators is only enough to satisfy internal leakages in the actuation systems. In this mode, the first check valve 114 is open and the second check valve 116 is closed sending flow from the second pump 104 to the bypass valve 118. Flow from the bypass valve 118 is fed along line 134 to the bypass line 131 to be fed back to the first and second pump 102/104 inlet. The bypass valve 118 is also forced open by flow from the PRV 112 along line 128.

Figure 2:
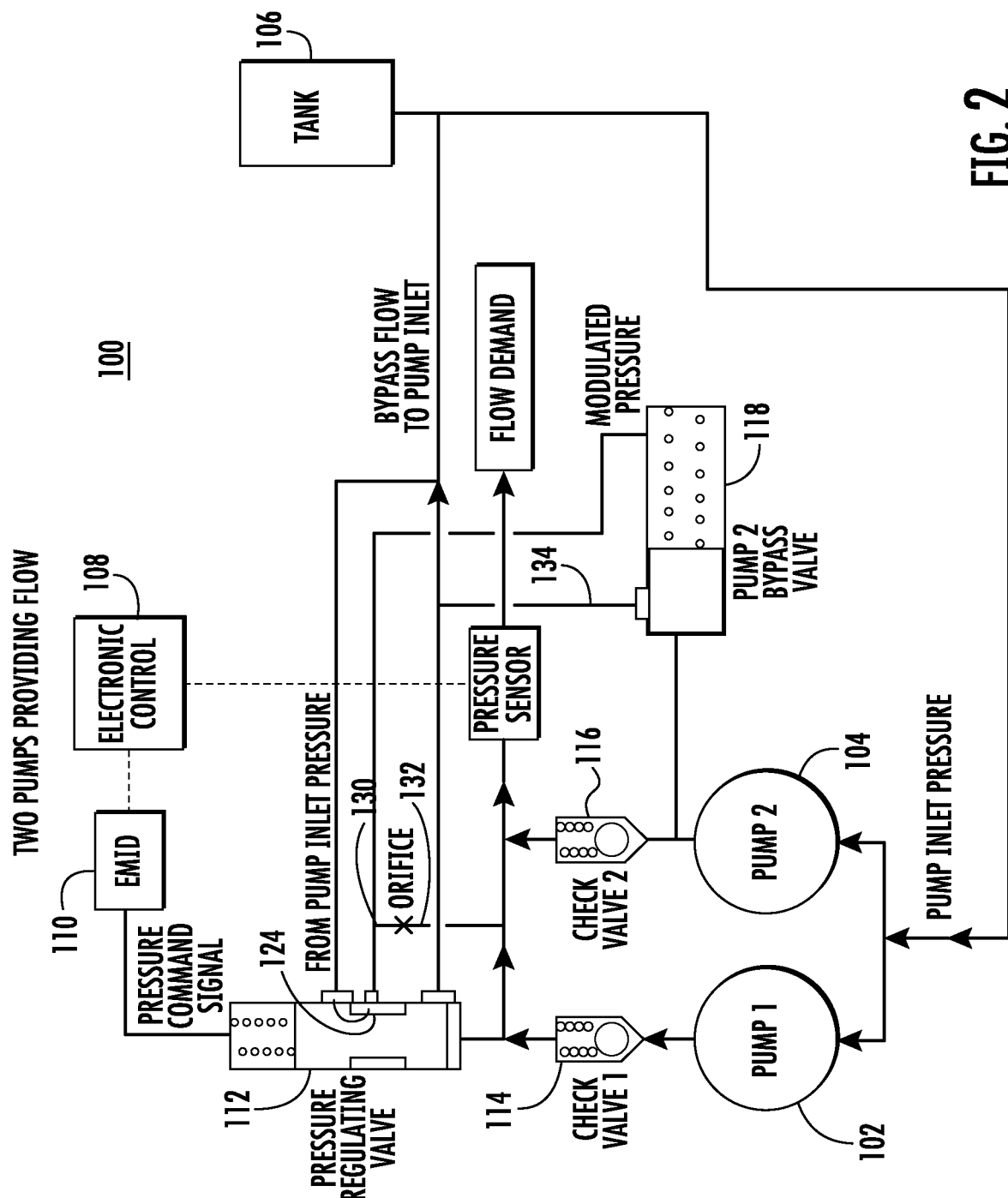
FIG. 2 is a schematic view of the embodiment of fuel supply system of FIG. 1, showing two pumps providing fuel flow.

Referring now to FIG. 2, a second mode of the system is shown. The second mode includes high fuel demand when actuator(s) are commanded to move, requiring flow from the pump to move them. During high flow demand the second check valve 116 can be partially or fully open. Fuel from the second pump 104 supplements fuel flow from the first pump 102 along fuel demand line 122. As the fuel demand is high, the PRV 112 closes and limits or stops flow from going to the pump inlet along line 131. The PRV also closes a signal window 124 partially or completely, which causes the pressure signal to the bypass valve 118 to increase because of the high pressure fed to the modulated pressure line 128 by the orifice 132. Orifice 132 can be used for supplying a high pressure flow from the flow demand 120 to the modulated pressure line 128 which is connected to signal window 124 in the PRV, which provides flow to the pump inlet, thus increasing the modulated pressure as the PRV closes. The increased signal pressure 128 forces the bypass valve 118 to close partially or completely, which restricts or stops flow from the second pump 104 to the bypass line 134. There is also an intermediate condition where the second check valve 116 is at least partially open and bypass valve 118 is partially open. As the signal pressure to the bypass valve 118 increases, the bypass valve 118 will close more until it is fully closed.

Figure 3:
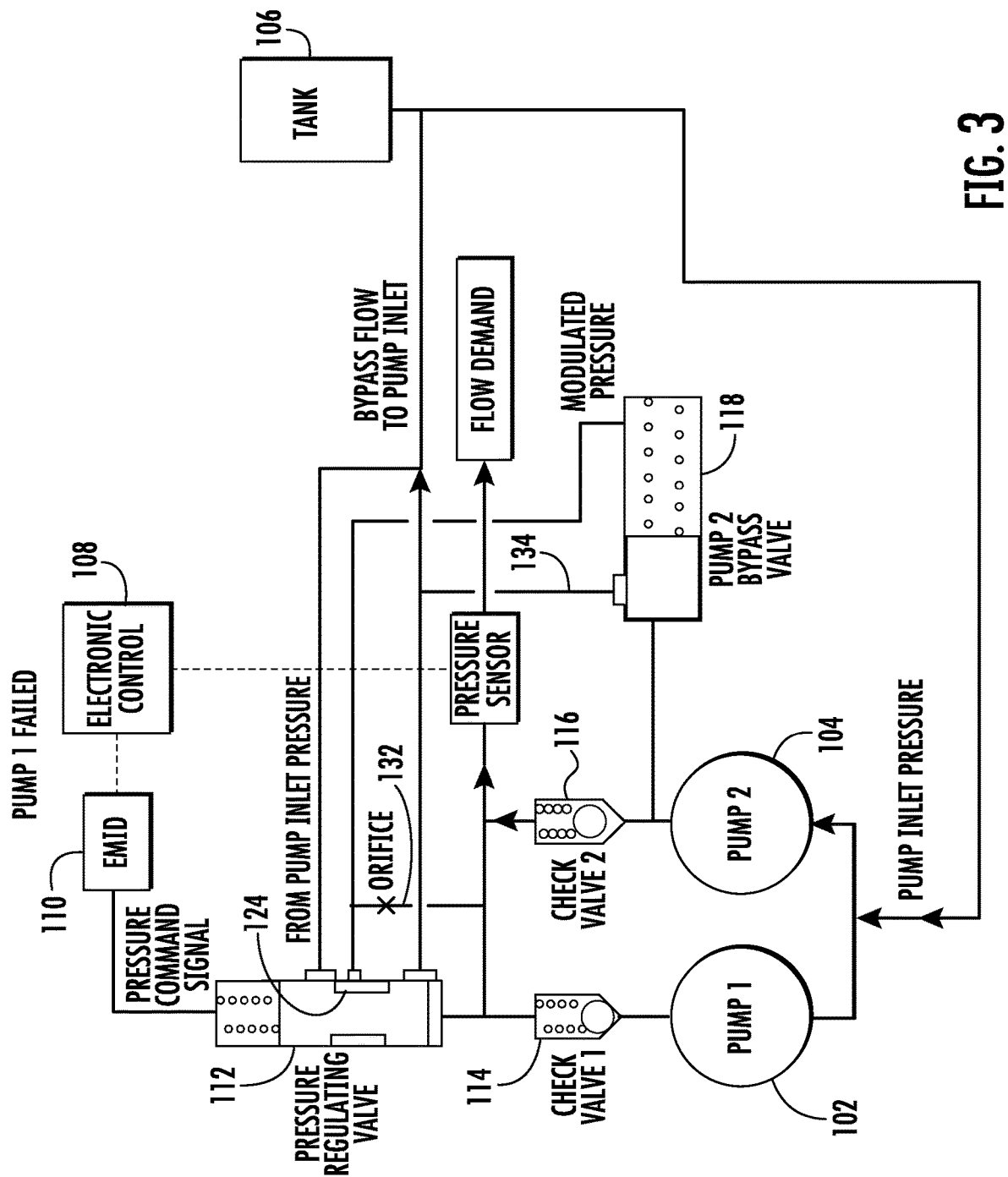
FIG. 3 is a schematic view of the embodiment of fuel supply system of FIG. 1, showing a situation when a first pump is not accessible.

Referring now to FIG. 3, when the first pump 102 is offline, such as due to a failure, the first check valve 114 closes. To maintain the required fuel pressure, the PRV 112 closes and does not allow fuel flow to the pump inlet along line 131. The lack of flow through the signal window 124 in the PRV 112 increases the modulated pressure 128, which forces the bypass valve 118 to close and not allow flow from the second pump 104 to the bypass line 134 ensuring that flow is supported by the second pump 104.

Referring now to FIG. 4, the PRV 412 is controlled by a first EMID 410, from which it receives pressure command signals based on flow demand 420. A second, independent EMID 409 is be used for controlling the bypass valve 418. A second independent pressure sensor 437 is connected to the fuel line connecting the bypass valve 418 and the second pump 404 to supply pressure data to the EEC 408.

In FIG. 4, the system is also shown in a first or low demand mode. The first check valve 414 is open and the second check valve 416 is closed sending flow from the second pump 404 to the bypass valve 418. Flow from the bypass valve 418 is fed along line 434 to the bypass line 431 to be fed back to the first and second pump 402/404 inlet.

In a traditional pumping system with one pump, the entire flow generated by the pump is at the set pressure and becomes overdesigned for situations where flow is low. In this instance, when the flow demand is low, one of the pumps is operating at a low pressure differential, thus reducing the power needed for pumping and reducing the amount of heat added to the fuel. However, when flow demand increases, both pumps can provide flow in parallel. Also, if one of the pumps fails, the other pump can provide sufficient flow to safely land the aircraft. This feature can, for example, improve safety and reliability.

The methods and systems of the present disclosure, as described above and shown in the drawings, are used with an improved engine architecture that is more efficient and adaptable between extreme and typical flight conditions and flow requirements. While the systems and methods of the subject disclosure have been shown and described with reference to preferred embodiments, those skilled in the art will readily appreciate that changes and/or modifications may be made thereto without departing from the scope of the subject disclosure.

What is claimed is:

1. A pump system for a gas turbine engine comprising:
a fluid flow demand line for delivering fluid to an actuation or burner system;
a first pump connected to the fluid flow demand line;
a second pump connected, in parallel to the first pump, to the fluid flow demand line;
a bypass line fluidically connected to an inlet of the first pump and an inlet of the second pump;
a pressure regulating valve (PRV) comprising:
a valve window fluidically connecting the fluid flow demand line and the bypass line when the PRV is in an open position or a partially open position, and wherein the fluid flow demand line is fluidically disconnected from the bypass line when the PRV is in a closed position; and
a signal window, wherein the signal window is fluidically connected to the bypass line when the PRV is in the open position or the partially open position;
a bypass valve fluidically connecting an outlet of the second pump to the bypass line when the bypass valve is open, and fluidically disconnecting the outlet of the second pump from the bypass line when the bypass valve is closed;
a signal pressure line fluidically connecting the signal window to a control side of the bypass valve, wherein the signal window of the PRV fluidically connects the signal pressure line to the bypass line when the PRV is in the open position, and wherein the signal pressure line is fluidically disconnected from the bypass line when the PRV is in the closed position; and
an orifice line fluidically connecting the signal pressure line to the fluid flow demand line between the signal window and the bypass valve.

2. The system of claim 1, wherein the PRV is actuated by a first Electro-Mechanical Interface Device (EMID) which receives electronic signals from an Electronic Engine Control (EEC) which measures pressure at the fluid flow demand line for delivering fluid to the actuation or burner system from the first pump and from the second pump.

3. The system of claim 2, wherein a pressure sensor is connected to the fluid flow demand line configured to supply a demand flow pressure data signal to the EEC.

4. The system of claim 3, further comprising a second EMID for controlling the bypass valve.

5. The system of claim 4, further comprising a second independent pressure sensor connected to a fluid line connecting the bypass valve and the second pump configured to supply a pressure data signal to the EEC.

6. The system of claim 1, wherein the orifice line includes an orifice therein for supplying a high pressure flow to the signal pressure line from the fluid flow demand line.

7. The system of claim 1, wherein the fluid flow demand line is fluidically connected to the burner or actuation system.

8. The system of claim 1, wherein the first pump and the second pump are different sizes.

9. The system of claim 1, wherein the system supplies fuel.

10. The system of claim 1, further comprising:
a first check valve fluidically connecting the first pump to the fluid flow demand line; and
a second check valve fluidically connecting the second pump to the fluid flow demand line.

11. The system of claim 10, further comprising:
an Electro-Mechanical Interface Device (EMID) fluidically connected to a spring cavity of the PRV.

12. The system of claim 11, further comprising:
an Electronic Engine Control (EEC) in electronic communication with the EMID.

13. The system of claim 12, further comprising:
a pressure sensor on the fluid flow demand line and in electronic communication with the EEC.

14. The system of claim 13, further comprising:
a second EMID fluidically connected to the control side of the bypass valve and in electronic communication with the EEC.

15. The system of claim 14, further comprising:
a second pressure sensor on a fuel line connecting the bypass valve to an outlet of the second pump and in electronic communication with the EEC.

* * * * *